United States Patent

Ostrowski

[11] Patent Number: 5,179,787
[45] Date of Patent: Jan. 19, 1993

[54] DRAPERY INSTALLATION TOOL

[76] Inventor: Clarence Ostrowski, 1482 Chy Y, Hatley, Wis. 54440

[21] Appl. No.: 710,327

[22] Filed: Jun. 5, 1991

[51] Int. Cl.⁵ .......................... G01B 5/14; B25H 7/00
[52] U.S. Cl. ...................................... 33/613; 33/528; 33/679; 33/562
[58] Field of Search ................ 33/613, 679, 194, 528, 33/644, 645, 666, 669, 574, 578, 464

[56] References Cited

U.S. PATENT DOCUMENTS

| | | | |
|---|---|---|---|
| 2,197,505 | 4/1940 | Mosher | 33/666 |
| 2,830,378 | 4/1958 | Giuan | 33/679 |
| 3,371,423 | 3/1968 | Paul | 33/666 |
| 3,672,064 | 6/1972 | Elkins et al. | 33/528 |
| 3,724,085 | 4/1973 | Wentworth | 33/562 |
| 3,816,933 | 6/1974 | Dillinger | 33/679 |
| 3,842,510 | 10/1974 | Elliott | 33/528 |
| 4,285,135 | 8/1981 | Minozzi, Jr. | 33/528 |
| 4,610,092 | 9/1986 | Hafele | 33/613 |
| 4,791,731 | 12/1988 | Dickinson et al. | 33/528 |

Primary Examiner—William A. Cuchlinski, Jr.
Assistant Examiner—C. W. Fulton
Attorney, Agent, or Firm—Richard C. Litman

[57] ABSTRACT

A drapery installation tool includes a top and bottom square block held together by a pair of bolts, each block having a groove for adjustably mounting a pair of measuring rules, openings for mounting a pair of spring biased pins, and additional openings forming guides for a drill. The measuring rules locate the pins relative to a window casing. The pins when hit by a hammer form starting holes for drapery and curtain rod brackets in wallboard, or in the alternative, act as center punches in wood and wood panelling. The drill guides are used to guide a drill when starter holes are needed in wood and wood panelling.

9 Claims, 2 Drawing Sheets

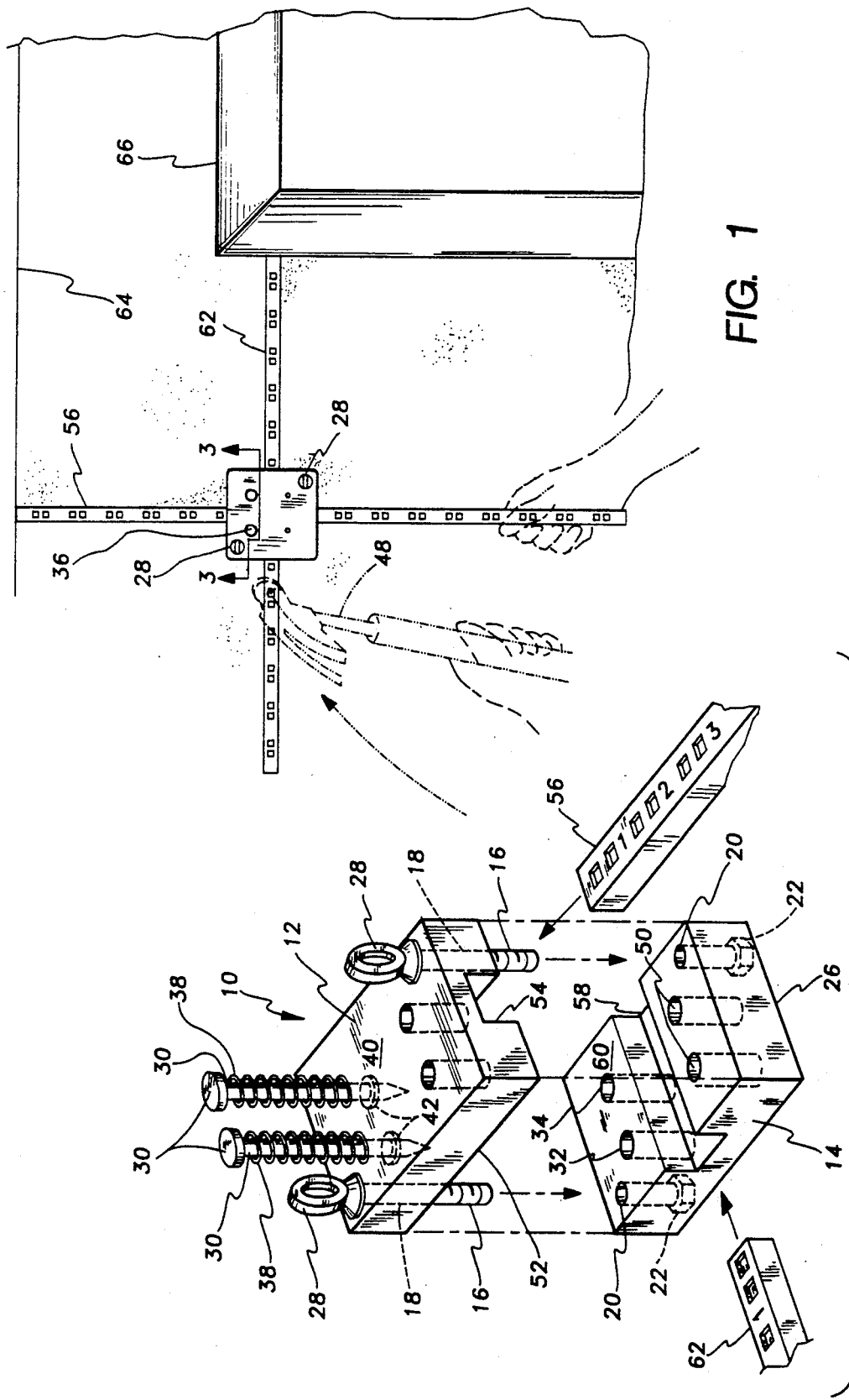

DRAPERY INSTALLATION TOOL

BACKGROUND OF THE INVENTION

1. Field of the Invention

This invention relates to a drapery installation tool which quickly enables the provision of locating holes for drapery and curtain brackets in accurate and economical fashion. The tool provides a means for measuring from the ceiling and the window casement in order to accurately locate the bracket holes horizontally and vertically, a means for punching said holes through wallboard up to ½ inch thick, and a guide for drilling said holes through wood or wood paneling, the holes normally being 3/16 inch in diameter.

In the past the mounting of drapery or curtain brackets has been a difficult and time consuming procedure at best with little assurance that the brackets are symmetrical to a window opening or that they are aesthetically positioned. The tool described hereinbelow enables the user to overcome these difficulties in economic fashion.

2. Description of the Related Prior Art

Hole locating gauges are well known in the prior art. U.S. Pat. No. 2,197,505 issued Apr. 16, 1940, to Arthur M. Mosher discloses a variation of a center punch gauge which includes two scales each having a stop member adapted to abut adjacent edges of a work piece, the scales being adjustably mounted in intersecting slots or channels in a guide member, whereby a center punch also mounted on the guide member may be located along coordinate x and y axes to identify the location of a hole to be drilled within boundaries of the work piece. The center punch is spring biased to a raised position relative to the work piece, and may be selectively located in either of two sleeves carried by the guide member.

U.S. Pat. No. 2,830,378 issued Apr. 15, 1958, to David E. Givan similarly discloses a center punching tool including two scales adjustably and detachably connected by a clamp, the center punch being located at one end of one of the scales, whereby a hole to be drilled in a work piece may be located relative to two intersecting edges of the work piece. The center punch in the Givan device, as in the Mosher device, is spring biased to a raised position.

U.S. Pat. No. 3,371,423 issued Mar. 5, 1968, to Bryant M. Paul discloses a device for marking a point for the installation of fasteners such as is required when hanging drapes around a window. The device involves a pair of scales adjustably mounted in a support block, the ends of the scales respectively bearing against the ceiling and the window casement so as to locate marking plate having a plurality of apertures thereon for insertion of a marking pen or the like. Since the marking pen or the like is not fixed to the marking plate there is a real possibility that the positions marked with the Paul device may not be symmetrically located relative to the window, through the selection of the wrong aperture.

U.S. Pat. No. 3,724,085 issued Apr. 3, 1973, to Henry C. Wentworth discloses a drapery rod installation template which includes a flat, elongated rule having a pair of spaced drill guide fixtures extending from the body of the rule whereby holes may be drilled for locating drapery fixtures and the like relative to a window casement.

U.S. Pat. No. 4,610,092 issued Sep. 9, 1986, to Henry M. Hafele discloses a gauge to aid in locating brackets for hanging drapes and the like, said gauge including positioning structure having right angularly related surfaces engageable with internal surfaces of the window casement, said positioning structure supporting a gauge plate having a grid of marking openings extending therethrough. A marking pin is insertable through a selected opening when the angularly related surfaces register at a corner of the window and the plate is against the wall.

U.S. Pat. No. 4,791,731 issued Dec. 20, 1988, to John Dickinson, et al, discloses a device for installing brackets for drapery rods and the like which includes a measuring tape having a center punch gauge at one end and a level to ensure that the punched marks are vertically aligned.

SUMMARY AND OBJECTS OF THE INVENTION

It is an object of this invention to provide a drapery installation tool which will enable a user in a single operation to locate and form the holes for the installation of brackets for drapery or curtain rods.

It is a further object of this invention to provide a drapery installation tool with adjustable horizontal and vertical rulers, at least one pin capable of forming holes in conventional wallboard up to ½ inch thick or in the alternative capable of functioning as a center punch when used with wood paneling, and with at least one drill guide for guiding a drill in the event the holes need to be drilled.

It is another object of the invention to provide a drapery installation tool which may be easily separated into its component parts for convenient storage and shipping.

These and other objects are achieved by providing a clamping block formed of two mating squares which, in one preferred embodiment are each 3 inches on a side and ¾ inch thick. The two squares are joined together by means of two diagonally located bolts which pass through holes in the upper and lower squares and held in position by nuts countersunk into the bottom surface of the bottom square. In each mating surface of the squares a groove is provided for one of two rulers which are slidably adjustable in planes which are perpendicular to each other. In one preferred embodiment the grooves are approximately ⅝ inch wide and 3/16 inch deep to accommodate the rulers. Also provided in the squares are four holes designed to accommodate pins and/or drills having a 3/16 inch diameter. Each of the four holes is located approximately 1 inch from the two nearest intersecting sides of each square. Located in two of the holes parallel to one side are two pins which in one preferred embodiment are 2 ¾ inches long, and have a 3/16 inch diameter tapering to a point at one end and a hammer engageable head at the other end. The pins are provided with retraction springs located between the hammer engageable head and the upper surface of the top square. In the mating surfaces of the top and bottom squares the pin holes are countersunk with a wider diameter hole whereby lock washers may be mounted on the pins to limit the movement of the pins in both the outward and inner direction of movement, so that on the one hand the pins will not fall out of the clamping block, while on the other hand the pins are capable of forming holes which are 3/16 inches in diameter in wallboard up to ½ inch thick. The remaining two pin holes are used as guides for a 3/16 inch drill if the holes for bracket screws are to be provided in wood or wood paneling.

Other objects, features, and advantages of this invention will become apparent from the following detailed description and the appended claims, reference being had to the accompanying drawings forming a part of the specification, wherein like reference numerals designate corresponding parts of the several views.

BRIEF DESCRIPTION OF THE DRAWINGS

FIG. 1 is an environmental view showing the use of the drapery installation tool.

FIG. 2 is a perspective exploded view showing the structure of the several components of the drapery installation tool.

DETAILED DESCRIPTION OF THE PREFERRED EMBODIMENT

Figure 3:
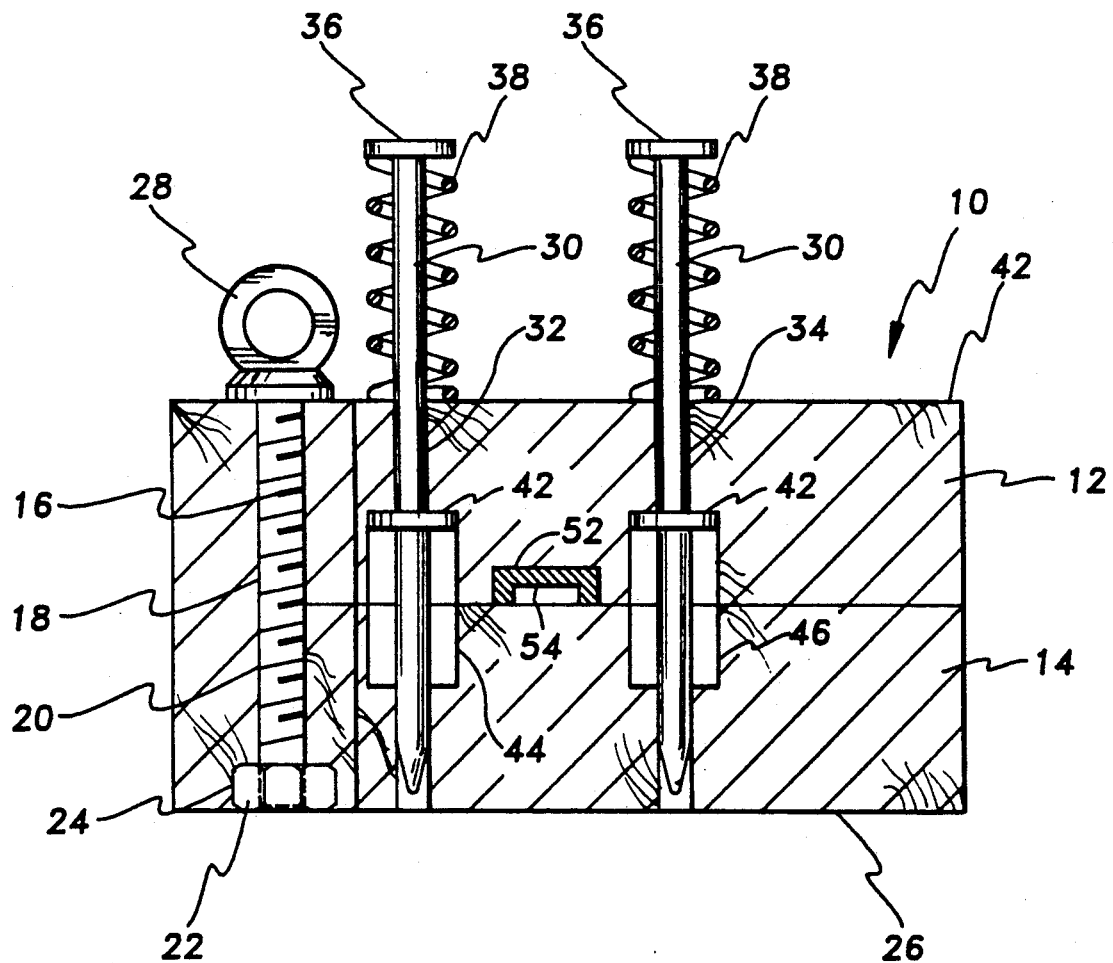
FIG. 3 is a cross-sectional view taken along Line 3—3 of FIG. 1 showing the internal structure of the clamping block, pins and one of the locking bolts.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not limitation.

The structure of the drapery installation tool is best shown in FIGS. 2 and 3, while the method of using the tool is shown in FIG. 1. Turning first to FIGS. 2 and 3, clamping block 10 is shown to be comprised of two mating square blocks 12 and 14. The top and bottom square blocks 12 and 14 are held together in mating fashion by two diagonally located bolts 16 passed through holes 18 and 20 and cooperating nuts 22 located in similarly configured openings 24 in the bottom surface 26 of bottom square block 14. The tops 28 of bolts 16 are configured to allow easy turning thereof to allow separation of top and bottom square blocks 12 and 14.

Also included on clamping block 10 are two pins 30 having a 3/16 inch diameter passing through holes 32 and 34 in each of top and bottom square blocks 12 and 14. The centerlines of holes 32 and 34 are each located 1 inch from the two adjacent intersecting sides of blocks 12 and 14 for reasons explained below. Surrounding each pin 30 between the head 36 thereof and the top surface 40 of top square block 12 is a compression spring 38 designed to maintain the bottom tips of pins 30 recessed above bottom surface 26 as shown in FIG. 3. Mounted on each pin 30 is a flange 42 in the form of a lock washer which rides in a countersunk portion 44 and 46 of the respective holes 32 and 34 to prevent pins 30 from falling out of the clamping box 10 during use. The depth of countersunk portions 44 and 46 is sufficient to enable pins 30, when struck by a hammer 48, to travel far enough to produce 3/16 inch diameter starter holes for bracket screws in wallboard having a thickness of ½ inch or less. If the wall is of wood panelling or the like, pins 30 function as center punches to identify the location for subsequent drilling. Holes 50, each having a centerline located 1 inch from the two adjacent intersecting sides of blocks 12 and 14, are provided as guides for a 3/16 inch drill.

Formed in the bottom surface 52 of block 12 is a groove 54 which is ⅝ inch wide and 3/16 inch deep for receiving a first rule 56 adjustably therein. Another similarly sized groove 58 is provided in the top surface 60 of block 14 for receiving a second rule 62 adjustably therein disposed in a plane perpendicular to the plane of first rule 56.

The process for locating and attaching brackets for drapery and curtain rods will now be described. First, the length of the drapery to be hung is measured, one inch is added to the measured length, and the increased length is marked on the wall. The distance from the ceiling 64 to the mark is then measured, and rule 56 is set to the measured length from the ceiling as measured to the top of clamping block 10. When the tip of rule 56 bears against ceiling 64 as shown in FIG. 1, pins 30 are now properly located at the correct vertical height for locating the drapery brackets at the left side of window casing 66. Similarly, the width of one half of the drapery or curtains is measured, and 5 inches are subtracted from that measured width to account for the width of the drapery or curtain material which extends perpendicularly from the wall. This provides a horizontal measurement enabling the setting of rule 62 in clamping block 10 relative to window casing 66, thereby locating pins 30 both vertically and horizontally relative to window casing 66. Thereafter, pins 30 may be struck by a hammer to provide either a center punch if the wall is formed of wood or wood panelling, or to provide starter holes in wallboard. If holes need to be drilled in wood or wood panelling, rules 56 and 62 may be adjusted to locate drill holes 50 over the marks made by pins 30, whereby, bracket screw holes may be drilled by means of a drill, not shown, guided by holes 50. The bracket screw holes on the opposite side of window casing 66 may be located merely by reversing horizontal rule 62 in clamping block 10. If there is a need to locate a bracket at the center of window casing 66, this may be achieved by simply rotating block 10 90 degrees and adjusting horizontal rule 62 to the vertical length from ceiling 64. The distance between pins 30 can be designed to meet the spacing requirements of particular bracket screw holes, if desired.

While it will be apparent that the preferred embodiment of the invention herein disclosed is well calculated to fulfill the objects above-stated, it will be appreciated that the invention is susceptible to modification variation and change without departing from the proper scope or fair meaning of the subjoined claims.

I claim:

1. A drapery installation tool comprising:
a clamping block;
means to identify, in coordinate fashion, the location of a bracket for a supporting rod relative to a ceiling and a window casing carried by said clamping block; and
means to provide starter holes for bracket screws;
said means to provide starter holes comprising at least two spring biased pin means guided by at least two bores in said clamping block, each spring biased pin means having a flange thereon formed from a lock washer and guided by a counterbore in said clamping block, said spring biased pin means when struck by a hammer means forming said starter holes;
said at least two spring biased pin means being used as a center punch means, and further including at least one drill guide means formed by a bore through said clamping block for guiding a drill to form said starter holes at the location identified by said spring biased pin means.

2. A drapery installation tool comprising:
a clamping block;

means to identify, in coordinate fashion, the location of a bracket for a supporting rod relative to a ceiling and a window casing carried by said clamping block; and means to provide starter holes for bracket screws;

said means to identify comprising a pair of rules mounted in adjustable fashion in said clamping block, said pair of rules being mounted transversely at a 90 degree angle;

said means to provide starter holes comprising at least two spring biased pin means guided by at least two bores in said clamping block, each spring biased pin means having a flange thereon formed from a lock washer and guided by a counterbore in said clamping block, said spring biased pin means when struck by a hammer means forming said starter holes;

said at least two spring biased pin means being used as a center punch means, and further including at least one drill guide means formed by a bore through said clamping block for guiding a drill to form said starter holes at the location identified by said spring biased pin means.

3. A drapery installation tool comprising:

a clamping block;

means to identify, in coordinate fashion, the location of a bracket for a supporting rod relative to a ceiling and a window casing carried by said clamping block, said means to identify comprising a pair of rules mounted in adjustable fashion in said clamping block; and means to provide starter holes for bracket screws including at least one spring biased pin means guided by a bore in said clamping block;

said at least one spring biased pin means having a flange thereon formed from a lock washer and guided in a counterbore in said clamping block to prevent removal of said at least one spring biased pin means from said clamping block;

said clamping block comprising cooperating top and bottom square block means connected by bolt means;

said top and bottom square block means including at least one coaxial bore and counterbore for guiding said at least one spring biased pin means and said flange formed from a lock washer for providing said starter holes when said at least one spring biased pin means is struck by a hammer;

said at least one spring biased pin means also selectively functioning as a center punch means to locate said starter holes;

said top and bottom square block means being provided with at least one drill guide means to guide a drill when said at least one spring biased pin means is selectively functioning as a center punch means; and said rules being adjustably mounted in grooves provided in said top and bottom square block means; whereby said starter holes may be selectively provided in both wallboard and wood panelling.

4. A drapery installation tool as in claim 3, there being at least two spring biased pin means, each having a flange thereon formed from a lock washer, and at least two drill guide means provided in said clamping block;

said at least two spring biased pin means being located to straddle one of said pair of rules on one side of a second of said pair of rules; and said at least two drill guide means being located to straddle said one of said rules on a second side of said second of said pair of rules.

5. A drapery installation tool comprising:

a clamping block means including a top square block means and a bottom square block means joined face-to-face by manually tightened bolt and nut means;

at least one spring biased pin means for selectively providing starter holes in wallboard, and a locating punch hole in wood, when struck by a hammer means, said spring biased pin means being suitably located on said clamping block means;

at least one drill guide means located in said clamping block means for guiding a drill in providing said starter holes in wood;

said at least one spring biased pin means being provided with flange means formed of a lock washer to enable said at least one spring biased pin means to remain in said clamping block means; and groove means provided in cooperating surfaces of said top and bottom square block means for adjustably mounting at least one rule means; whereby starter holes for brackets mounting drapery and curtain rods may be easily located and provided.

6. A drapery installation tool as in claim 5, there being at least two spring biased pin means each having a flange means formed of a lock washer, at least two drill guide means, and at least two rule means provided in said clamping block means;

said at least two spring biased pin means being located to straddle one of said pair of rules on one side of a second of said pair of rules;

said at least two drill guide means being located to straddle said one of said rules on a second side of said second of said pair of rules;

said pair of rules being disposed transversely of one another at a 90 degree angle in grooves formed in said clamping clock means.

7. A method for installing drapery and curtain brackets using an installation tool, said method comprising the steps of:

a) measuring the length of the material to be hung in suitable units;

b) adding one unit of measurement to the measured length;

c) marking the measured length plus one unit as a vertical measurement from the floor on a wall adjacent a window casing;

d) measuring from the ceiling down to the wall marking;

e) setting the vertical measurement from the ceiling in said installation tool by shifting a vertical rule carried by a clamping block relative to said clamping block;

f) measuring the width of the material to be hung and subtracting five units therefrom;

g) setting a horizontal rule, carried by said clamping block, relative to said clamping block in said installation tool to the width measurement minus said five units and minus one-half the width of said window casing;

h) resting an end of the vertical rule of said installation tool against the ceiling and an end of said horizontal rule of said installation tool against said window casing, thereby locating the position of a rod bracket; and i) hitting an end of a spring biased pin means having a flange formed of a lock washer located on said clamping block one unit below an upper edge of said clamping block of said installation tool, said spring biased pin means providing center punch holes and said installation tool including drill guide means on said clamping block for guiding a drill means in the formation of starter holes in wood and wood panelling; whereby the location of said bracket is properly identified relative to said window casing.

8. A method as in claim 7, wherein said spring biased pin means creates starter holes in wallboard for screws mounting said bracket relative to said window casing.

9. A method as in claim 7, wherein said clamping block of said installation tool is formed of two square blocks held together by bolts; said vertical and horizontal rules being adjusted by sliding relative to grooves included in said two square blocks; said spring biased pin means being mounted in a first set of holes; and said drill guide means being provided by a second set of holes in said two square blocks.

* * * * *